900
United States Patent [19]

Blackmore et al.

[11] 3,956,207

[45] May 11, 1976

[54] PHENOLIC ADHESIVES

[75] Inventors: Kenneth A. E. Blackmore, Bellingham, Wash.; Albert W. Stout, deceased late of Bellingham, Wash., by Zelda M. Stout, executrix

[73] Assignee: Georgia-Pacific Corporation, Portland, Oreg.

[22] Filed: Feb. 25, 1974

[21] Appl. No.: 445,275

[52] U.S. Cl. ............................. 260/17.5; 156/335; 260/51 R; 260/52; 260/57 C; 260/25; 260/124 A; 428/529; 428/528
[51] Int. Cl.[2] ......................................... C09J 3/28
[58] Field of Search ............ 260/17.5, 124 A, 51, 260/52, 57, 17.2, 25; 156/335; 428/529

[56] References Cited
UNITED STATES PATENTS

| | | | |
|---|---|---|---|
| 3,148,177 | 9/1964 | Wiley et al. | 260/17.5 X |
| 3,227,667 | 1/1966 | Moffitt et al. | 260/17.5 |
| 3,597,375 | 8/1971 | Ludwig et al. | 260/17.5 |
| 3,658,638 | 4/1972 | Ludwig et al. | 260/17.5 X |

Primary Examiner—Murray Tillman
Assistant Examiner—T. DeBenedictis, Sr.
Attorney, Agent, or Firm—Peter P. Chevis

[57] ABSTRACT

A ready-to-use phenolic adhesive for the manufacture of plywood containing heat treated spent sulfite liquor solids is described. The spent sulfite liquor solids are heat treated in a dry form until from 20% to 50% of the dry heated solids are insoluble in an aqueous 0.5 molar sodium carbonate solution.

16 Claims, No Drawings

PHENOLIC ADHESIVES

This invention relates to phenol-aldehyde compositions, more particularly to phenolic-aldehyde adhesives used especially in plywood and particulate board manufacture.

Adhesives for plywood preparation must have certain working characteristics in addition to the proper adhesive properties for a satisfactory performance under modern production methods. Even though good bond strengths may be possible under certain conditions, the resin may not be suitable for plywood adhesives, if these results cannot be readily achieved under the accepted production methods. In many operations, the assembled panels of plywood or laminated wood products are prepressed cold prior to heat setting of the adhesive. By prepressing the assembled panels, the capacity of the heated platen press is increased and the quality of the plywood improved. In cold prepressing, the adhesive must have sufficient tack to permit the handling of the prepressed panels without shifting of the plys after the pressure is removed. After consolidation of the panel, it is stored or held for various lengths of time until the panel can be subjected to high temperature and pressure to finally set the adhesive. The hotpressing operation is a more involved operation using the more costly equipment and usually is the limiting production factor in the mill. As adhesive which will permit the consolidated panel to be stored for long periods of time, for example a hold time of 16 to 40 hours before hotpressing gives considerable flexibility to the mill. The plys may be laid up on one shift and hotpressed on the next shift or held over night for pressing in the morning to increase the production from the mill.

Phenolic resins generally are not used alone as plywood adhesives. Various fillers and modifiers have to be added to the resin to control the properties and different formulations have to be used for different conditions. For example, the formulation for southern pine veneer differs from the adhesive used for Douglas Fir. The adhesives generally are formulated just prior to use because of poor stability of the adhesive when intermixed with fillers or other additives. The fillers generally have a tendency to settle or float out of the resin or the mixed adhesives thicken or thin out rapidly upon standing. The formulation of the adhesive is not only time consuming but it is performed by personnel lacking sufficient chemical training to be able to make the necessary adjustments in the formulation to obtain optimum results under the variation in operating conditions normally encountered. Thus, it would be very desirable to have a phenolic plywood adhesive which could be formulated at the resin plant and made available to the mills in a form which would be used without requiring further processing at the mill. It is further desirable to have a phenolic adhesive which would be operative for different veneers and under the different conditions normally encountered without having to continually adjust the adhesive by addition or deletion of different additives or modifiers.

It is, therefore, an object of this invention to provide a ready-to-use adhesive, especially applicable to plywood manufacture. A further object is to provide a ready-to-use adhesive which may be applied by spray, roll, or curtain coater. A still further object is to provide a ready-to-use adhesive which will have good shelf-like and prepress properties and permit long hold or stand time. A still further object is to provide a ready-to-use adhesive which may be used under the varying conditions generally encountered in the mill and for different veneers.

The above and other objects are attained according to this invention by a thermosetting adhesive comprising a phenol-aldehyde resin intermixing under alkaline conditions with a sufficient amount of a dry heated lignosulfonate to enhance the moisture retention properties of the adhesive. The lignosulfonate is heated in a dry state at a temperature in the range of 350° to 625°F until from 20% to 50%, preferably from 30% to 40%, of the heated product is insoluble in an aqueous 0.5 molar sodium carbonate solution. The adhesive containing the dry heated lignosulfonate has exceptionally good stand time properties. After prepressing or coldpressing, the panels may be held to over 40 hours and still good bonds are obtained after hotpressing. The heat treated spent sulfite liquor provides sufficient body to the adhesive to give good coldpressing and sufficient moisture retention and thermoplasticity to permit the unusually long stand times prior to hotpressing.

Lignin is a polymeric substance of substituted aromatics found in plant and vegetable tissue associated with cellulose and other plant constituents. While there is some variation in the chemical structure of lignin and of other constituents found in the plant, depending upon the type of the plant, place where the plant is grown and also upon the method used in recovery or isolation of the particular constituents from the plant tissue, the basic structure and properties of these materials upon sulfonation are similar and form the well-known group of materials commonly referred to as "lignosulfonates" or "spent sulfite liquor". One of the main sources of lignosulfonates is the residual pulping liquors obtained in the pulp and paper industry where lignocellulosic materials such as wood, straw, corn starch, bagasse, and the like are processed to recover the cellulose or pulp by the sulfite pulping process. The lignocellulosic material is digested with a bisulfite or sulfite to obtain a residual pulping liquor containing the lignin in sulfonated form and other constituents. Generally the spent sulfite liquor will contain only about 40 to 65 weight percent of lignosulfonate, based on oven dried solids, with the remainder being carbohydrates and other organic and inorganic constituents dissolved in the liquor. The lignosulfonates are usually present in the liquor as a mixture of solfonated lignins of various molecular weights varying from less than 1,000 to 100,000 and higher. The lignosulfonates and other sulfonated plant constituents will be present as salts of cations such as magnesium, calcium, sodium, or other cations used as a base in the pulping operation. It is not necessary to separate the sulfonated lignin constituents from the other constituents prior to heat treatment. The lignin product as obtained containing all of the constituents may be used as such or the product may be subjected to different pretreatments, such as alkaline or acid treatment, fermentation, or oxidized to modify or remove some of the non-lignin constituents prior to the dry heating period. Certain pretreatments of the spent sulfite liquor solids may simplify the heating operation since the pretreatments decrease the tendency of the solids to ignite upon heating.

The heat treatment of the sulfonated lignin or spent sulfite liquor is carried out in a dry form at a temperature of from 350° to 625°F in a manner similar to that described in Markham et al. U.S. Pat. Nos. 3,476,740 and 3,544,460 except that the dry heating operation may be carried to a somewhat greater extent on the average. While the spent sulfite liquor may be heated as a magnesium, calcium, sodium, ammonium or any base, it is generally preferred to add the dry heated lignosulfonate to the adhesive as the sodium, potassium, or ammonium salt form or mixtures thereof. Normally, it is more convenient to convert the liquor to the desired base prior to the drying and heating of the liquor. When ammonium spent sulfite liquor is to be heated, the liquor solids may be heated at a lower temperature and a shorter period of time. The presence of ammonium ions may result in condensation of the lignosulfonate by interaction of the lignin with the ammonium ions thus requiring less heating to obtain the desired solubility characteristics.

No particular method of heat treatment is necessary other than heating the product in a dry state to a temperature of at least 350°F until the heated product has an insolubility in the range of 20% to 50%, preferably from 30% to 40%. The time required to maintain the material at the temperature to obtain the desired properties varies inversely to the temperature chosen. At the lower temperature, a longer time is necessary whereas at the higher temperatures such as 600° to 625°F, the time required just to heat the product to the temperature may be sufficient.

In heating the product in a dry state, apparently more than one rearrangement or reaction is effected. Initially in heating the product to temperatures of around 350°F, an evolution of vapor is obtained indicating that the material is undergoing some rearrangement. If the product is heated too rapidly, it may ignite or undergo a spontaneous degradation above this temperature. This inconvenience can be eliminated by pretreating the spent sulfite liquor solids as noted in the above-cited patents such as by oxidation or maintaining the product at a lower temperature for a short period of time to permit the reaction to proceed. In heating the product at a moderate rate, the pH of the product will continue to increase with heating until a temperature in the range of 450° to 525°F is reached at which point the pH may begin to decrease which is evidence of some reaction or rearrangement starting to take place at this point. Also, upon heating the product at a moderate rate, generally most of the product remains soluble in the alkali medium until the higher temperatures are reached. At temperatures of 450° to 525°F, maintaining the product at the temperature from about 15 minutes to 2 hours may be sufficient to insolubilize the product to the extent desired, while at a lower temperature of 350° to 375°F, 24 hours or more may be required.

It should be noted that the solubility is determined in an alkaline medium such as a 0.5 molar sodium carbonate solution. The solubility of the product in the alkaline medium is greater than in water at neutral conditions. For example, a product having about 45% of the dry solids insoluble in the alkaline aqueous medium may have an insolubility from 75 to 80% in water. Also, the insolubles obtained are generally gels which swell to a greater extent after an alkaline treatment than if just contacted with water at pH 7. For example, the insolubles obtained upon contacting a dry heated product with an aqueous 0.5 M sodium carbonate solution may have a wet volume of about 6 to 20 milliliters per gram of dry insolubles in presence of the sodium carbonate electrolyte. Upon washing the insoluble constituents with water to remove the electrolyte, an increased swelling is obtained to the extend that the wet volume of the gels may be in the range of about 15 to 50 milliliters per gram of dry insolubles. The same dry heated product contacted with water may have from 45% to 80% of the product in the insoluble residue which will have a wet volume of about 6 to 16 milliliters per gram of dry residue. Contacting this residue with 0.5 M sodium carbonate solution will dissolve a portion of the residue and increase the swelling of the remaining portion to a similar extent to that obtained above with the sodium carbonate treatment. Apparently, when the dry heated lignosulfonate is intermixed with the phenol-aldehyde resin, the product does not settle out but an insoluble finely dispersed gel is obtained which upon application to plywood veneer will control the penetration and also provide sufficient body and thermoplasticity to the adhesive to permit good bonds to be formed upon hotpressing after hold times of up to 40 or more hours.

The dry heated lignosulfonate or dry heated spent sulfite liquor solids are preferably intermixed with phenol and aldehyde during condensation of the phenol with aldehyde in preparation of the resin or added to the phenol-aldehyde resin at the end of the resin preparation. The addition of the dry heated solids or lignosulfonate during the resin preparation subjects the dry heated product to alkaline treatment to obtain the swelling of the insolubles to the high volume gels. The dry heated product may also be added to the adhesive prior to use and intermixed for sufficient time to obtain the swelling or the dry heated product may be contacted with an alkali solution, such as sodium carbonate or alkali metal hydroxide to swell the product prior to addition to the resin or adhesive. The viscosity of the mixture increases with the swelling of the dry heated product so that allowances for changes in viscosity have to be made to obtain a product or adhesive of the proper viscosity when the alkaline treatment of the dry heated solids is substantially completed. With the addition of the dry heated product during the condensation of the phenol with the aldehyde, the alkaline treatment of the dry heated product is completed by the time the desired condensation between the phenol and the aldehyde has been obtained. Thus, the condensation is carried out to the extent necessary to obtain a product of a desired viscosity which will not be changing due to further swelling of the dry heated insolubles. The same methods or procedures presently used for the condensation of phenol with aldehyde in preparation of resins for plywood adhesives are employed, using from 1 to 3 equivalents of aldehyde per mole equivalent of phenol, when the dry heated lignosulfonate is added during the resin preparation. The mixture is heated under alkaline conditions until sufficient condensation has been obtained to obtain the desired viscosity, generally being in the range of 250 to 5,000 centipoises depending upon the use to be made of the adhesive. The condensation is preferably carried out with periodic additions of caustic as commonly used in preparation of plywood adhesive resins.

While the adhesive containing only the resin and the dry heated lignosulfonate may be used without any additional modifiers or extenders, additives normally added to plywood adhesives such as amylaceous materials, fillers, hardening agents and others may be added to prepare adhesives of the type conventionally employed at present in plywood manufacture. However, this is not necessary and the adhesive containing only the resin and dry heated lignosulfonate may be used by itself in the various conventional processes for plywood preparation. The viscosity of the final mixture upon condensation of the phenol with the aldehyde as such is not critical but is generally controlled for optimum effectiveness of the adhesive for the particular condition under which it is to be used. For example, an adhesive having a different viscosity would be desired for application by spray than for application with a mechanical spreader. Also, a higher viscosity adhesive would be desirable for the more porous veneer such as southern pine than for Douglas Fir. Further, if modifiers or extenders are to be added, such as for example starch and other agents which will increase the viscosity, the viscosity of the resin with the heat treated lignosulfonate would be maintained at a lower level to take into account the increase in viscosity which may be obtained by the addition of the filler or additive.

Generally sufficient amount of the dry heated product is added to improve the holdtime and other properties of the adhesive. An amount in the range of 2 to 25 weight percent of the weight of the phenol and aldehyde in the adhesive is usually used with 10 to 15% being preferred. Where optimum strengths are not required, the dry heated product may also be used as a filler or extender in which event amounts up to 50% or more may be added. The addition of the dry heated lignosulfonate will also give good bonds upon hotpressing shortly after assembly of the panels as well as imparting the desired properties to the adhesive to be able to form a strong bond after exceptionally long hold times after assembly.

In use of the adhesive, the various known methods and procedures used in plywood or chipboard preparation may be employed. The amount spread, and temperature of hot press, pressures employed and other conditions are within the conditions presently used with the variations normally encountered and obvious to those skilled in the art.

While the resins used in the preparation of adhesives for plywood are generally phenol-formaldehyde resins, the dry heated lignosulfonate may also be used with other phenol-aldehyde resins such as those described in U.S. Pat. Nos. 3,360,376; 2,437,981; or No. 2,457,493.

The following examples further illustrate the invention.

EXAMPLE I

A calcium base fermented spent sulfite liquor was converted to a sodium base liquor by addition of sodium sulfate, precipitating the calcium as calcium sulfate which was then removed. The resulting sodium base spent sulfite liquor was spray dried and then subjected to heating in a rotating drum. The spray dried powder was heated at a rate such that it required about 1½ to 1¾ hours to heat the spent sulfite liquor solids to 480°F after which the product was maintained at the latter temperature for about 50 minutes. Thirty-one percent of the product was insoluble in the 0.5 molar sodium carbonate solution and 68% was insoluble in water. After contact with the carbonate solution, the swelling of the insoluble portion was 5 milliliters per gram in the presence of sodium carbonate and 21 milliliters per gram after washing to remove the sodium carbonate.

In determining the solubility of the dried product in the sodium carbonate solution, 1 gram of the heated product, screened to pass a 100 U.S. sieve screen, was added to 100 milliliters of 0.5 molar sodium carbonate solution and heated for 1 hour at 85°C with periodic stirring after which it was centrifuged for about 15 minutes at about 400 × gravity. The solution was decanted and the residue or insoluble material remaining in the centrifuged tubes was washed three times with water by mixing the insolubles with 100 milliliters of water and recentrifuging the mixture for each washing with the last washing being centrifuged at about 1500 × gravity. The washed insolubles were dried and the insolubility of the product thus determined. The volume of the insolubles after washing was also noted prior to drying and used for determination of the swelling of the insolubles on the basis of volume per one gram of dried residue.

The above dry heated spent sulfite liquor was screened to remove particles larger than the 100 mesh. The heated product passing through a 100-mesh screen was then used in preparation of a phenol-formaldehyde resin adhesive by the usual procedure. The dry heated product was mixed with formaldehyde and phenol and cooked with periodic addition of caustic until the mixture containing about 40 weight percent solids had a viscosity of 1000 to 1100 centipoises at 25°C. The dry heated spent sulfite liquor added represented about 12% of the phenol and formaldehyde used. The amount of caustic used was about 15 weight percent of the phenol and formaldehyde.

The above prepared adhesive without addition of other modifiers or fillers was tested as an adhesive for exterior grade plywood by the preparation of 5/8 inch plywood panel made from southern pine veneer. Panels were prepared using veneer having a moisture content in the range of about 1.8% to 2.5%. Panels of the veneer were assembled and allowed to stand for different periods of time prior to hotpressing. The spread of adhesive was such that from 75 to 80 lbs. of adhesive per 1,000 square feet of double glue line were used. The panels were pressed at 300°F at 200 lbs. per sq. inch of pressure for 6 minutes. After setting for 24 hours, six test specimens from each panel were tested according to API Vacuum-Pressure test for exterior grade plywood adhesive The average results of the wood failure of the bottom glue line and the center glue line, and the assembly times are shown in the table below.

| Veneer | Stand Time, Minutes | % Wood Failure Vacuum & Pressure Test | |
|---|---|---|---|
| | | Bottom Glue Line | Center Glue Line |
| Southern Pine | 15 | 93 | 94 |
| | 30 | 88 | — |
| | 45 | 88 | 80 |

To check the stability of the adhesive, the adhesive was stored at 77°F for 20 days and the viscosity of the adhesive was periodically determined to note the change in viscosity. The results obtained are shown below.

| Days Stored at 77°F | Viscosity — Centipoises (Brookfield) |
|---|---|
| 0 | 1070 |
| 1 | 1292 |

| Days Stored at 77°F | Viscosity — Centipoises (Brookfield) |
|---|---|
| 2 | 1360 |
| 6 | 1730 |
| 9 | 2280 |
| 13 | 2620 |
| 20 | 6100 |

The stability of the dry heated lignosulfonate from settling in the adhesive was determined by storing 1000 milliliters of the adhesive in a 1000 milliliter graduated cylinder for 6 days at room temperature and then determining the viscosity of the top 100 milliliters and of the 100 milliliters at the bottom and also noting whether there was any sediment at the bottom of the cylinder. The viscosity for the top 100 milliliters was 1610 centipoises, and the bottom 100 milliliters had a viscosity of 1680 centipoises. No sediment was present at the bottom of the cylinder.

EXAMPLE II

A fermented calcium base liquor converted to a sodium base was heated in a dry form in a manner similar to that described above. The product was heated at a rate such that it required about 4 hours and 15 minutes to reach 480°F after which the product was maintained at that temperature for about 60 minutes. It was 33% insoluble in a 0.5 molar sodium carbonate solution and 68% in water. The water insoluble portion had a swelling of 5 milliliters per gram, which constituents insoluble in the 0.5 M sodium carbonate solution had a swelling of 33 milliliters per gram after water washing. The pH of the product was 8.5. The dry heated lignosulfonate was then intermixed with phenol and formaldehyde in the ratio and manner similar to that described in Example I above. The phenol and formaldehyde containing the dry heated lignosulfonate modifier was condensed as above to a product having a 210°F gel time of about 25 minutes. The adhesive was stored in a 1000 milliliter graduate cylinder for 6 days at room temperature and no settling of the added lignosulfonate was obtained over this period.

The adhesive was tested as a plywood adhesive for exterior grade use on southern pine veneer. The tests were performed as described above by the preparation of 5/8 inch panels constructed of 5 plys of southern pine veneer. A press time of 6 minutes at 300°F was used at a pressure of 200 lbs. per square inch. The southern pine veneer had moisture contents in the range of from 3.3% to 5.2% and runs were made using a stand time of 5 minutes, 15 minutes, 30 minutes, and 45 minutes. In the test, the wood failure under API Vacuum-Pressure test of the bottom glue line and also of the center glue line were noted. The average wood failures for the different assembly times for the bottom and the center glue lines are shown in the table below.

| Stand Time, Minutes | Percent Wood Failure, Bottom Glue Line | Percent Wood Failure, Center Glue Line |
|---|---|---|
| 5 | 98 | 96 |
| 15 | 96 | 96 |
| 30 | 88 | 75 |
| 45 | 88 | 82 |

The above adhesive was also tested in the preparation of 6 panels each of the 5/8 inch plywood using Douglas Fir veneer. The adhesive was heated to a temperature in the range of from 100° to 110°F and was applied by use of a spray gun in an amount of from 72 to 82 lbs. per 1,000 sq. ft. of double glue line. The panels were laid up over a period of from 5 to 15 minutes and then prepressed for 4 minutes at 150 lbs. per sq. inch. After prepressing, 2 panels each were permitted to stand for hold times of 6 hours, 10 hours, 18 hours, and 24 hours before hotpressing at 300°F at 175 lbs. per sq. inch for 6 minutes to cure the adhesive. From the hotpressed panels, 6 test specimens from each of the panels were taken and subjected to the vacuum-pressure test as above for exterior grade use. The results obtained are shown in the table below.

| Hold Time, Hours | % Wood Failure — Vacuum-Pressure Test | |
|---|---|---|
| | Bottom Glue Line | Center Glue Line |
| 6 | 95 | 94 |
| 10 | 98 | 98 |
| 18 | 97 | 98 |
| 24 | 98 | 97 |

A plant run was made using an adhesive employing the dry heated spent sulfite liquor solids. A fermented calcium base liquor was converted to a sodium base and dry heated at about 480°F in a pilot plant heated mixer. Five batch runs were made with sufficient variation between the batches to obtain products having insolubility of from 20% to about 41%. The 5 batches were combined and ground in a hammer mill such that the product would pass through a 100-mesh screen. The composite ground sample had an insolubility of 32% in a 0.5 molar sodium carbonate solution. The wet volume of the insolubles after water washing had a volume of 25 milliliters per gram of dry solids.

The above dry heated spent sulfite liquor was intermixed with phenol and formaldehyde during the resin formation in an amount representing about 10% of the formaldehyde and phenol used. The resin or adhesive was prepared in the usual manner with periodic addition of caustic being made until a viscosity in the range of 1000 to 1100 centipoises was obtained for the 40% solids concentration mixture.

In the plant test, the adhesive was used in the preparation of 5-ply, 5/8 inch Douglas Fir plywood employing a glue spread of from 70 to 74 lbs. per 1,000 sq. ft. of double glue line. After the layup of the plywood, the plywood was coldpressed and then held for hold times of from ¾ to 40 hours before hotpressing. Panels which had hold times of ¾ and 5 hours were hotpressed or bonded at 150 lbs. per sq. in. pressure and 300°F. The panels having hold times of 13, 20, and 40 hours were hotpressed or bonded at 175 lbs. per sq. in. at 300°F. The panels were tested according to the API Vacuum-Pressure test for exterior grade plywood. Four panels for each of the conditions were used and 5 to 6 specimens were obtained from each panel. The average wood failure and the conditions of the hotpressing are given in the table below.

| Hold Time | Pressure, PSI | Press Time, Minutes, 300°F | % Wood Failure, V-P Test | |
|---|---|---|---|---|
| | | | Center Glue Line | Bottom & Bottom Center Glue Lines |
| 45 Min. | 150 | 5½ | 96 | 93 |
| 50 Min. | 150 | 5 | 95 | 96 |
| 60 Min. | 150 | 4½ | 98 | 92 |
| 5 Hrs. | 150 | 5½ | 96 | 89 |
| 5 Hrs. | 150 | 5 | 95 | 80 |
| 13 Hrs. | 175 | 5½ | 98 | 94 |
| 13 Hrs. | 175 | 5 | 94 | 97 |
| 20 Hrs. | 175 | 5 | 97 | 94 |
| 40 Hrs. | 175 | 5 | 92 | 96 |

The wood failure of 89% and 80% for the bottom and bottom glue lines for the 5 hour hold time was due to some spotty or low adhesive spread areas resulting in the lower values being obtained.

EXAMPLE IV

An unfermented calcium base was evaporated and spray-dried and the dried product heated in a rotating drum. The product was heated at a rate such that it required about 1 hour and 25 minutes to reach 500°F and then was maintained at the latter temperature for about 20 minutes. Thirty-one percent of the product was insoluble in 0.5 molar sodium carbonate solution. After water washing the insolubles obtained upon contact with the sodium carbonate solution, the insolubles had a swelling of 28 milliliters per gram solids.

The above dry-heated calcium base spent sulfite liquor solids were screened to remove particles larger than 100-mesh and then used in preparation of a phenol-formaldehyde resin adhesive by a procedure similar to that described above. The dry-heated product was mixed with phenol and formaldehyde and cooked with periodic additions of caustic until a mixture containing about 40 weight percent solids had a viscosity of about 1000 centipoises at 25°C. The dry-heated spent sulfite liquor solids were added in an amount of about 12% of the amount of phenol and formaldehyde used in the resin formation.

The above resin was tested in the preparation of five-ply, 5/8 inch Douglas Fir panels. The adhesive was used in an amount of about 80 pounds of adhesive per 1000 square feet of double glue line. After assembly of the panels they were pre-pressed and permitted to sit at room temperature for different lengths of time before hot-pressing at 285°F at 175 pounds per square inch for 6¼ minutes. The panels were tested according to API Vacuum-Pressure Test for exterior grade plywood adhesive. The results of wood failure of the bottom glue line and center glue line and the time from the time the adhesive was applied to hot-pressing are given in the table below.

| Time | Percent Wood Failure, Bottom Glue Line | Percent Wood Failure, Center Glue Line |
|---|---|---|
| 65 minutes | 92 | 97 |
| 2 hours | 97 | 98 |
| 6 hours | 97 | 95 |
| 24 hours | 98 | 97 |

What is claimed is:

1. Thermosetting plywood adhesive comprising a water-soluble phenol-aldehyde resin intermixed under alkaline conditions with a heat-treated lignosulfonate in an amount sufficient to improve the moisture retention properties of the adhesive, said heat-treated lignosulfonate being heated in the dry state at a temperature in the range of 350° to 625°F until from 20% to 50% of the dry heated lignosulfonate is insoluble in an aqueous 0.5 molar sodium carbonate solution.

2. A composition of claim 1 wherein the lignosulfonate is spent sulfite liquor solids heated at a temperature in the range of 425° to 525°F and intermixed in an amount of from 2 to 25 percent of the weight of the phenol and aldehyde in the adhesive.

3. A composition according to claim 2 wherein the spent sulfite liquor solids are heat-treated in sodium salt form.

4. A composition according to claim 3 wherein the phenolaldehyde resin is a phenol-formaldehyde resin having a mole ratio of phenol to formaldehyde of 1:1.6 to 1:2.5 and the spent sulfite liquor solids are heated at a temperature in the range of 425° to 525°F until from 30 to 40 percent of the dry heated solids are insoluble.

5. A composition according to claim 2 wherein the heat-treated spent sulfite liquor is added to phenol and aldehyde and the mixture heated under alkaline conditions to condense the phenol and aldehyde to form the phenol-aldehyde resin.

6. A composition according to claim 5 wherein the lignosulfonate is spent sulfite liquor solids heat-treated in sodium salt form.

7. A composition according to claim 5 wherein the lignosulfonate is a spent sulfite liquor heat-treated in calcium salt form.

8. A process for the preparation of a stable thermosetting adhesive composition of phenol-aldehyde resin which comprises intermixing a heat-treated lignosulfonate with the phenol and aldehyde in an amount of from 2 to 25 percent of the weight of the phenol and aldehyde, and heating the mixture under alkaline conditions to condense the phenol with the aldehyde, said heat-treated lignosulfonate being heated in a dry state at a temperature in the range of from 350° to 625°F until from 20% to 50% of the lignosulfonate is insoluble in an aqueous 0.5 molar sodium carbonate solution.

9. A process according to claim 8 wherein the phenolaldehyde resin is a phenol-formaldehyde resin having a mole ratio of phenol to formaldehyde of 1:1.6 to 1:2.5.

10. A process according to claim 9 wherein the lignosulfonate is spent sulfite liquor in sodium salt form heated at a temperature in the range of 425° to 525°F in a dry state until from 30% to 40% of the dry heated spent sulfite liquor solids are insoluble and is intermixed in an amount of from 10 to 15 percent.

11. A process according to claim 9 wherein the lignosulfonate is a spent sulfite liquor in calcium salt form heated at a temperature in the range of 425° to 525°F in a dry state until from 30% to 40% of the dry heated spent sulfite liquor solids are insoluble and is intermixed in an amount of from 10 to 15 percent.

12. In a process for the lamination of plys of veneer in the manufacture of plywood, the improvement of using as an adhesive the composition of claim 1.

13. In a process for the lamination of plys for veneer in the manufacture of plywood, the improvement of using as an adhesive the composition of claim 3.

14. In a process for the lamination of plys for veneer in the manufacture of plywood, the improvement of using as an adhesive the composition of claim 5.

15. A laminate prepared by the process of claim 12.

16. A laminate prepared by the process of claim 13.

* * * * *